(12) United States Patent
Basye et al.

(10) Patent No.: US 10,325,598 B2
(45) Date of Patent: *Jun. 18, 2019

(54) SPEECH RECOGNITION POWER MANAGEMENT

(71) Applicant: Amazon Technologies, Inc., Seattle, WA (US)

(72) Inventors: Kenneth John Basye, Sutton, MA (US); Hugh Evan Secker-Walker, Newburyport, MA (US); Tony David, San Jose, CA (US); Reinhard Kneser, North Rhine-Westphalia (DE); Jeffrey Penrod Adams, Tyngsborough, MA (US); Stan Weidner Salvador, Tega Cay, SC (US); Mahesh Krishnamoorthy, Melrose, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,918

(22) Filed: Jul. 10, 2017

(65) Prior Publication Data
US 2018/0096689 A1 Apr. 5, 2018

Related U.S. Application Data

(63) Continuation of application No. 13/711,510, filed on Dec. 11, 2012, now Pat. No. 9,704,486.

(51) Int. Cl.
*G10L 15/28* (2013.01)
*G10L 25/78* (2013.01)
*G10L 15/08* (2006.01)
*G10L 15/30* (2013.01)

(52) U.S. Cl.
CPC .............. *G10L 15/28* (2013.01); *G10L 15/30* (2013.01); *G10L 25/78* (2013.01); *G10L 2015/088* (2013.01)

(58) Field of Classification Search
None
See application file for complete search history.

(56) References Cited

U.S. PATENT DOCUMENTS

| 5,263,181 A | 11/1993 | Reed |
| 5,712,954 A | 1/1998 | Dezonno |
| 5,799,279 A * | 8/1998 | Gould ..................... G10L 15/26 704/275 |

(Continued)

FOREIGN PATENT DOCUMENTS

CN 1351745 A 5/2002

*Primary Examiner* — Thuykhanh Le
(74) *Attorney, Agent, or Firm* — Knobbe, Martens, Olson & Bear, LLP

(57) ABSTRACT

Power consumption for a computing device may be managed by one or more keywords. For example, if an audio input obtained by the computing device includes a keyword, a network interface module and/or an application processing module of the computing device may be activated. The audio input may then be transmitted via the network interface module to a remote computing device, such as a speech recognition server. Alternately, the computing device may be provided with a speech recognition engine configured to process the audio input for on-device speech recognition.

20 Claims, 7 Drawing Sheets

(56) References Cited

U.S. PATENT DOCUMENTS

| | | | |
|---|---|---|---|
| 5,893,065 A * | 4/1999 | Fukuchi | G10L 19/0204 704/229 |
| 5,983,186 A | 11/1999 | Miyazawa et al. | |
| 6,002,762 A * | 12/1999 | Ramsden | H04M 3/18 379/24 |
| 6,321,194 B1 | 11/2001 | Berestesky | |
| 6,397,186 B1 * | 5/2002 | Bush | G06F 3/167 704/274 |
| 6,629,070 B1 * | 9/2003 | Nagasaki | G10L 25/78 704/233 |
| 6,868,154 B1 | 3/2005 | Stuart et al. | |
| 7,286,987 B2 | 10/2007 | Roy | |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,428,272 B2 * | 4/2013 | Tohyama | G10K 11/175 381/73.1 |
| 8,909,522 B2 * | 12/2014 | Shperling | G10L 25/78 381/71.1 |
| 9,159,319 B1 | 10/2015 | Hoffmeister | |
| 2002/0107726 A1 * | 8/2002 | Torrance | G09B 7/02 705/12 |
| 2003/0040903 A1 * | 2/2003 | Gerson | G10L 25/78 704/211 |
| 2003/0065506 A1 | 4/2003 | Adut | |
| 2003/0105637 A1 * | 6/2003 | Rodriguez | G06F 17/2735 704/270 |
| 2003/0165325 A1 | 9/2003 | Blair et al. | |
| 2003/0216909 A1 | 11/2003 | Davis et al. | |
| 2004/0002862 A1 | 1/2004 | Kim et al. | |
| 2005/0108006 A1 | 5/2005 | Jurd et al. | |
| 2005/0203998 A1 | 9/2005 | Kinnunen et al. | |
| 2005/0216271 A1 * | 9/2005 | Konig | G10L 15/22 704/275 |
| 2006/0029190 A1 * | 2/2006 | Schultz | H04M 3/385 379/88.01 |
| 2007/0043563 A1 | 2/2007 | Comerford et al. | |
| 2007/0043868 A1 * | 2/2007 | Kumar | G06F 17/30707 709/226 |
| 2007/0266101 A1 * | 11/2007 | Patel | G06Q 10/107 709/206 |
| 2008/0235726 A1 * | 9/2008 | Sakao | H04N 5/44513 725/38 |
| 2008/0249779 A1 | 10/2008 | Hennecke | |
| 2008/0262927 A1 | 10/2008 | Kanayama et al. | |
| 2009/0005127 A1 * | 1/2009 | Frenger | H04W 52/28 455/574 |
| 2009/0018832 A1 * | 1/2009 | Mukaigaito | G10L 15/1815 704/251 |
| 2010/0062745 A1 * | 3/2010 | Silk | G06Q 10/10 455/411 |
| 2010/0076751 A1 * | 3/2010 | Chikuri | G10L 15/22 704/10 |
| 2010/0191520 A1 | 7/2010 | Gruhn et al. | |
| 2010/0223056 A1 | 9/2010 | Kadirkamanathan | |
| 2010/0277579 A1 | 11/2010 | Cho et al. | |
| 2010/0292987 A1 | 11/2010 | Kawaguchi et al. | |
| 2010/0306285 A1 * | 12/2010 | Shah | G06F 8/427 707/803 |
| 2011/0102157 A1 | 5/2011 | Tarkoma | |
| 2011/0276326 A1 * | 11/2011 | Fumarolo | H04M 3/42187 704/235 |
| 2012/0215537 A1 * | 8/2012 | Igarashi | G06F 3/167 704/249 |
| 2012/0239176 A1 * | 9/2012 | Lien | G10L 21/047 700/94 |
| 2012/0239402 A1 | 9/2012 | Washio et al. | |
| 2012/0278070 A1 | 11/2012 | Herve et al. | |
| 2012/0281859 A1 | 11/2012 | Villemoes et al. | |
| 2013/0060571 A1 * | 3/2013 | Soemo | G10L 15/30 704/251 |
| 2013/0085755 A1 | 4/2013 | Bringert | G10L 15/28 704/235 |
| 2013/0289994 A1 * | 10/2013 | Newman | G10L 15/22 704/254 |
| 2013/0289999 A1 | 10/2013 | Hymel | |
| 2013/0332479 A1 | 12/2013 | Liu et al. | |
| 2013/0339028 A1 * | 12/2013 | Rosner | G10L 15/222 704/275 |
| 2014/0114567 A1 | 4/2014 | Buchanan et al. | |
| 2014/0118404 A1 | 5/2014 | Griffin | |
| 2014/0122087 A1 * | 5/2014 | Macho | G10L 17/22 704/275 |
| 2014/0178049 A1 * | 6/2014 | Kihara | H04N 5/262 386/280 |
| 2014/0337016 A1 * | 11/2014 | Herbig | H04M 3/568 704/201 |
| 2014/0337031 A1 * | 11/2014 | Kim | G06F 3/167 704/256.5 |
| 2015/0120714 A1 | 4/2015 | Xu et al. | |
| 2015/0162002 A1 | 6/2015 | Liu et al. | |
| 2015/0310865 A1 * | 10/2015 | Fay | G10L 15/22 704/254 |

\* cited by examiner

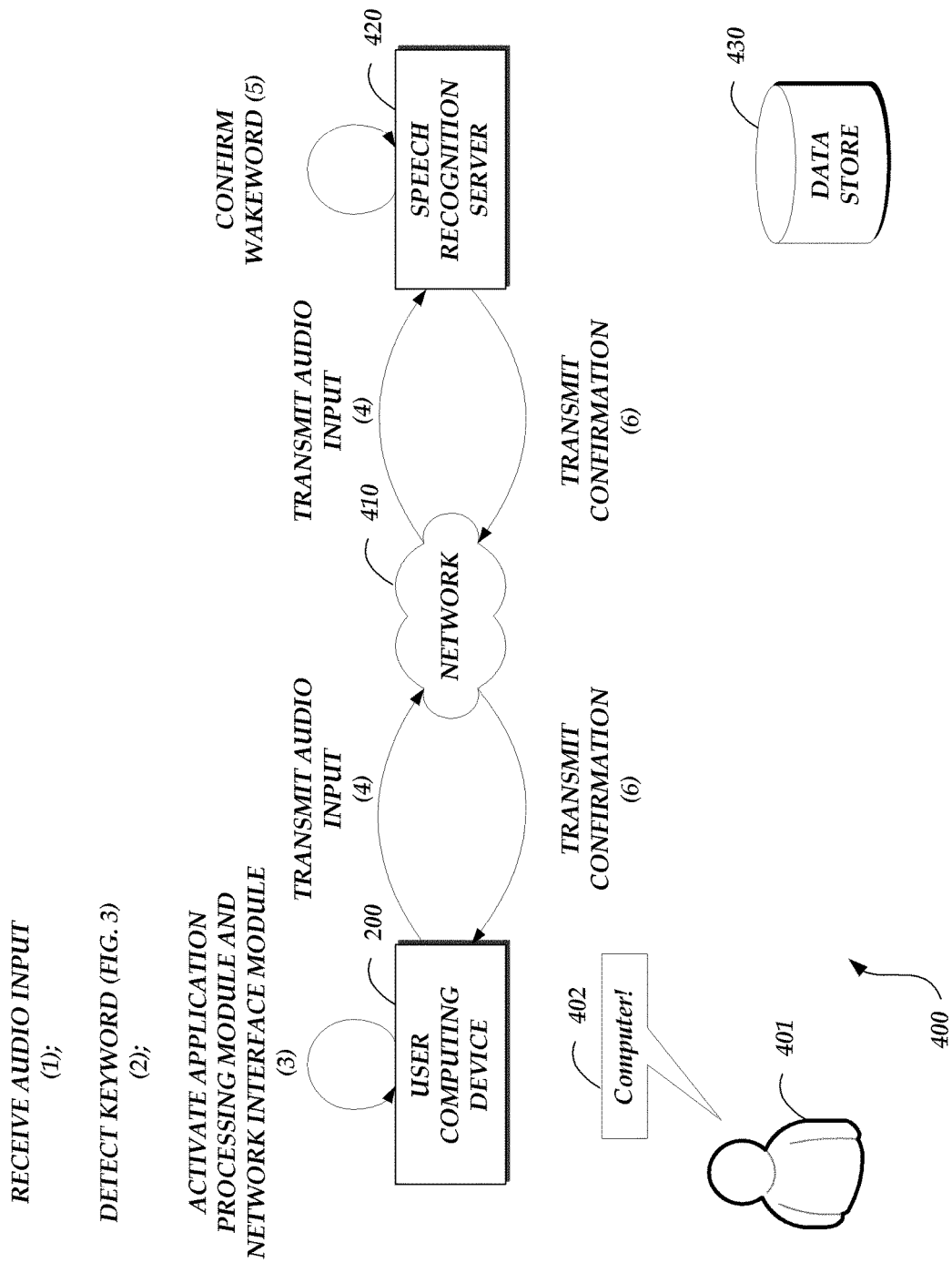

SPEECH RECOGNITION POWER MANAGEMENT

CROSS-REFERENCE TO RELATED APPLICATIONS

The present application is a continuation of U.S. patent application Ser. No. 13/711,510, filed Dec. 11, 2012, which is hereby incorporated by reference in its entirety.

BACKGROUND

Computing devices may include speech recognition capabilities. For example, a computing device can capture audio input and recognize speech using an acoustic model and a language model. The acoustic model is used to generate hypotheses regarding which sound subword units (e.g., phonemes, etc.) correspond to speech based on the acoustic features of the speech. The language model is used to determine which of the hypotheses generated using the acoustic model is the most likely transcription of the speech based on lexical features of the language in which the speech is spoken. A computing device may also be capable of processing the recognized speech for specific speech recognition applications. For example, finite grammars or natural language processing techniques may be used to process speech.

BRIEF DESCRIPTION OF THE DRAWINGS

The various aspects and many of the attendant advantages of the present disclosure will become more readily appreciated as the same become better understood by reference to the following detailed description when taken in conjunction with the accompanying drawings, wherein:

FIG. 4A, FIG. 4B, and FIG. 4C are state diagrams depicting an illustrative operation of a distributed speech recognition system.

DETAILED DESCRIPTION

Figure 1:
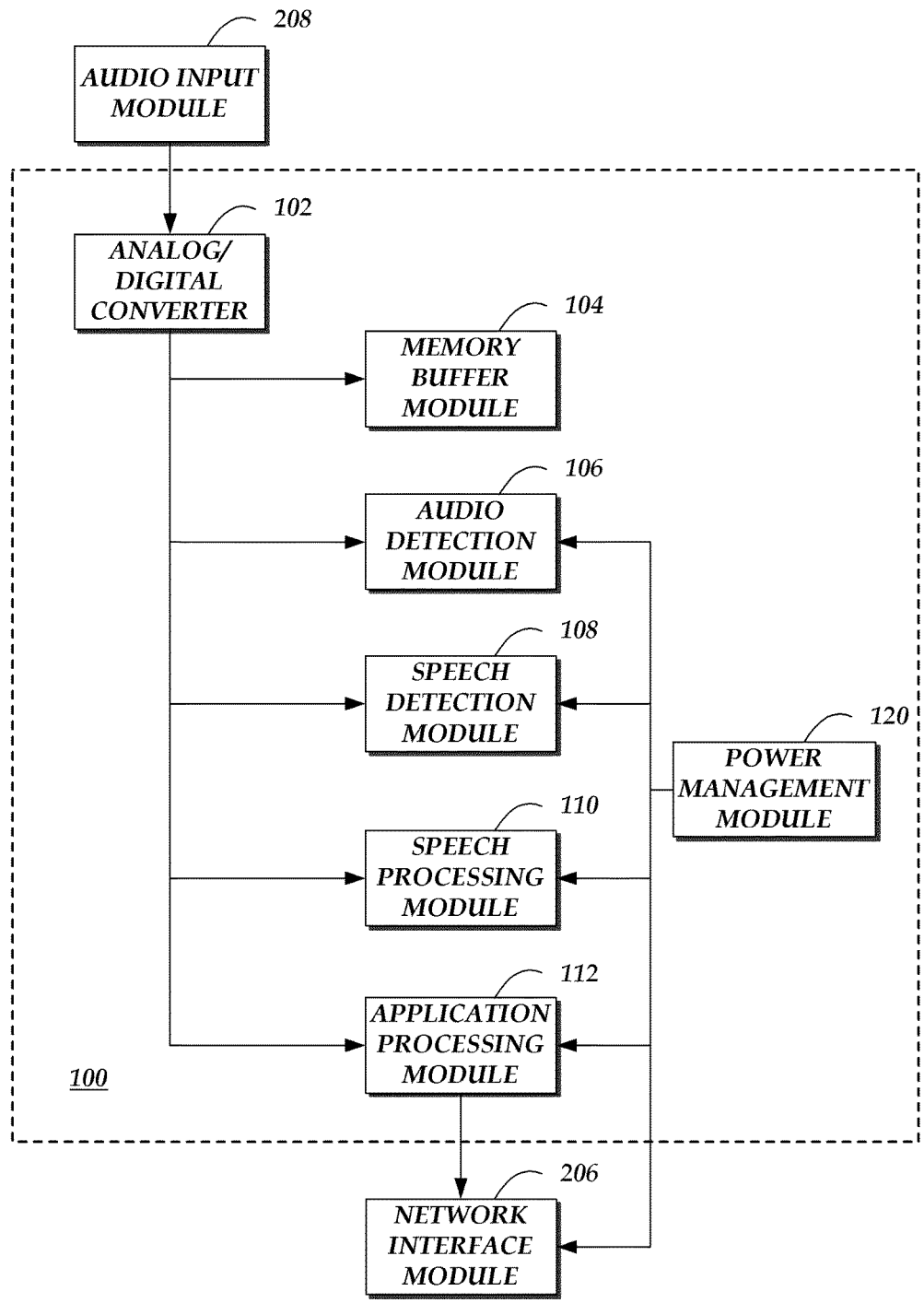
FIG. 1 is a schematic diagram depicting an illustrative power management subsystem.

In some current approaches to speech recognition, speech recognition capabilities are allocated among one or more computing devices in a distributed computing environment. In a particular example of these approaches, a first computing device may be configured to capture audio input, and may transmit the audio input over a network to a second computing device. The second computing device may perform speech recognition on the audio input and generate a transcription of speech included in the audio input. The transcription of the speech then may be transmitted over the network from the second computing device back to the first computing device. In other current approaches, the first computing device may be configured to capture audio input and transcribe the audio input on its own.

In these and other current approaches, the first computing device may be configured to remain in a persistently active state. In such a persistently active state, the first computing device may continuously maintain a network connection to the second computing device. The first computing device may also continue to power any hardware used to implement its own speech recognition capabilities. One drawback of these approaches, among others, is that the first computing device may consume unacceptable amounts of energy to maintain the persistently active state. Such energy demands may prove especially problematic for mobile computing devices that rely on battery power. Still other problems are present in current approaches.

Accordingly, aspects of the present disclosure are directed to power management for speech recognition. A computing device may be provided with a power management subsystem that selectively activates or deactivates one or more modules of the computing device. This activation may be responsive to an audio input that includes one or more pre-designated spoken words, sometimes referred to herein as "keywords." A keyword that prompts the activation of one or more components may be activated is sometimes referred to herein as a "wakeword," while a keyword that prompts the deactivation of one or more components is sometimes referred to herein as a "sleepword." In a particular example, the computing device may include a selectively activated network interface module that, when activated, consumes energy to provide the computing device with connectivity to a second computing device, such as a speech recognition server or other computing device. The power management subsystem may process an audio input to determine that the audio input includes a wakeword, and activate the network interface module in response to determining that the audio input comprises the wakeword. With the network interface module activated, the power management subsystem may cause transmission of the audio input to a speech recognition server for processing.

The power management subsystem may itself include one or more selectively activated modules. In some embodiments, one or more of the selectively activated modules are implemented as dedicated hardware (such as an integrated circuit, a digital signal processor or other type of processor) that may be switched from a low-power, deactivated state with relatively lesser functionality, to a high-power, activated state with relatively greater functionality, and vice versa. In other embodiments, one or more modules are implemented as software that includes computer-executable code carried out by one or more general-purpose processors. A software module may be activated (or deactivated) by activating (or deactivating) a general-purpose processor configured to or capable of carrying out the computer-executable code included in the software. In still further embodiments, the power management system includes both one or more hardware modules and one or more software modules.

The power management subsystem may further include a control module in communication with the one or more selectively activated modules. Such a control module is sometimes referred to herein as a "power management module," and may include any of the hardware or software described above. The power management module may cause the activation or deactivation of a module of the power management subsystem. In some embodiments, the power management module activates or deactivates one or more modules based at least in part on a characteristic of audio input obtained by an audio input module included in the computing device. For example, a module of the power management subsystem may determine one or more values, which values may include, for example, an energy level or volume of the audio input; a score corresponding to a likelihood that speech is present in the audio input; a score corresponding to a likelihood that a keyword is present in the speech; and other values. The module may communicate the one or more values to the power management module, which may either communicate with another module to cause activation thereof or communicate with the module from which the one or more values were received to cause deactivation of that module and/or other modules. In other embodiments, however, a first selectively activated module may communicate directly with a second selectively activated module to cause activation thereof. In such embodiments, no power management module need be present. In still further embodiments, a power management subsystem may be provided with one or more modules, wherein at least some of the one or more modules are in communication with each other but not with the power management module.

In an example implementation, the power management subsystem may include an audio detection module, which may be configured to determine an energy level or volume of an audio input obtained by the computing device. While the audio detection module may persistently monitor for audio input, the remaining components of the power management subsystem may remain in a low-power, inactive state until activated (either by the power management module or by a different module). If the audio detection module determines that an audio input meets a threshold energy level or volume, a speech detection module may be activated to determine whether the audio input includes speech. If the speech detection module determines that the audio input includes speech, a speech processing module included in the power management subsystem may be activated. The speech processing module may determine whether the speech includes a wakeword, and may optionally classify the speech to determine if a particular user spoke the wakeword. If the speech processing module determines that the speech includes the wakeword, an application processing module may be activated, which application processing module may implement a speech recognition application module stored in memory of the computing device. The speech recognition application may include, for example, an intelligent agent frontend, such as that described in "Intelligent Automated Assistant," which was filed on Jan. 10, 2011 and published as U.S. Publication No. 2012/0016678 on Jan. 19, 2012. The disclosure of this patent application is hereby incorporated by reference in its entirety. The selectively activated network interface module may also be activated as discussed above, and the audio input may be transmitted to a remote computing device for processing. This example implementation is discussed in greater detail below with respect to FIG. 3. Alternately, the power management subsystem may, responsive to detecting the wakeword, activate a processing unit that implements any on-device speech recognition capabilities of the computing device.

By selectively activating modules of the computing device, the power management subsystem may advantageously improve the energy efficiency of the computing device. The power management subsystem may further improve the energy efficiency of the computing device by selectively activating one or more of its own modules. While such implementations are particularly advantageous for computing devices that rely on battery power, all computing devices for which power management may be desirable can benefit from the principles of the present disclosure.

Turning now to FIG. 1, an illustrative power management subsystem 100 that may be included in a computing device is shown. The power management subsystem 100 may include an analog/digital converter 102; a memory buffer module 104; an audio detection module 106; a speech detection module 108; a speech processing module 110; an application processing module 112; and a power management module 120. The memory buffer module 104 may be in communication with the audio detection module 106; the speech detection module 108; the speech processing module 110; the application processing module 112; and a network interface module 206. The power management module 120 may likewise be in communication with audio detection module 106; the speech detection module 108; the speech processing module 110; the application processing module 112; and the network interface module 206.

The analog/digital converter 102 may receive an audio input from an audio input module 208. The audio input module 208 is discussed in further detail below with respect to FIG. 2. The analog/digital converter 102 may be configured to convert analog audio input to digital audio input for processing by the other components of the power management subsystem 100. In embodiments in which the audio input module 208 obtains digital audio input (e.g., the audio input module 208 includes a digital microphone or other digital audio input device), the analog/digital converter 102 may optionally be omitted from the power management subsystem 100. Thus, the audio input module 208 may provide audio input directly to the other modules of the power management subsystem 100.

The memory buffer module 104 may include one or more memory buffers configured to store digital audio input. The audio input obtained by the audio input module 208 (and, if analog, converted to digital form by the analog/digital converter 102) may be recorded to the memory buffer module 104. The audio input recorded to the memory buffer module 104 may be accessed by other modules of the power management subsystem 100 for processing by those modules, as discussed further herein.

The one or more memory buffers of the memory buffer module 104 may include hardware memory buffers, software memory buffers, or both. The one or more memory buffers may have the same capacity, or different capacities. A memory buffer of the memory buffer module 104 may be selected to store an audio input depending on which other modules are activated. For example, if only the audio detection module 106 is active, an audio input may be stored to a hardware memory buffer with relatively small capacity. However, if other modules are activated, such as the speech detection module 108; the speech processing module 110; the application processing module 112; and/or the network interface module 206, the audio input may be stored to a software memory buffer of relatively larger capacity. In some embodiments, the memory buffer module 104 includes a ring buffer, in which audio input may be recorded and overwritten in the order that it is obtained by the audio input module 208.

The audio detection module 106 may process audio input to determine an energy level of the audio input. In some embodiments, the audio detection module 106 includes a low-power digital signal processor (or other type of processor) configured to determine an energy level (such as a volume, intensity, amplitude, etc.) of an obtained audio input and for comparing the energy level of the audio input to an energy level threshold. The energy level threshold may be set according to user input, or may be set automatically by the power management subsystem 100 as further discussed below with respect to FIG. 3. In some embodiments, the audio detection module 106 is further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored and not processed by other components of the power management subsystem 100.

If the audio detection module 106 determines that the obtained audio input has an energy level satisfying an energy level threshold, it may communicate with the power management module 120 to direct the power management module 120 to activate the speech detection module 108. Alternately, the audio detection module 106 may communicate the energy level to the power management module 120, and the power management module 120 may compare the energy level to the energy level threshold (and optionally to the threshold duration) to determine whether to activate the speech detection module 108. In another alternative, the audio detection module 106 may communicate directly with the speech detection module 108 to activate it. Optionally, the power management module 120 (or audio detection module 106) may direct the audio input module 208 to increase its sampling rate (whether measured in frame rate or bit rate) responsive to the audio detection module 106 determining that the audio input has an energy level satisfying a threshold.

The speech detection module 108 may process audio input to determine whether the audio input includes speech. In some embodiments, the speech detection module 108 includes a low-power digital signal processor (or other type of processor) configured to implement one or more techniques to determine whether the audio input includes speech. In some embodiments, the speech detection module 108 applies voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the speech detection module 108 implements a limited classifier configured to distinguish speech from background noise. The classifier may be implemented by techniques such as linear classifiers, support vector machines, and decision trees. In still other embodiments, the speech detection module 108 applies Hidden Markov Model (HMM) or Gaussian Mixture Model (GMM) techniques to compare the audio input to one or more acoustic models, which acoustic models may include models corresponding to speech, noise (such as environmental noise or background noise), or silence. Still other techniques may be used to determine whether speech is present in the audio input.

Using any of the techniques described above, the speech detection module 108 may determine a score or a confidence level whose value corresponds to a likelihood that speech is actually present in the audio input (as used herein, "likelihood" may refer to common usage, whether something is likely, or the usage in statistics). If the score satisfies a threshold, the speech detection module 108 may determine that speech is present in the audio input. However, if the score does not satisfy the threshold, the speech detection module 108 may determine that there is no speech in the audio input.

The speech detection module 108 may communicate its determination as to whether speech is present in the audio input to the power management module 120. If speech is present in the audio input, the power management module 120 may activate the speech processing module 110 (alternately, the speech detection module 108 may communicate directly with the speech processing module 110). If speech is not present in the audio input, the power management module 120 may deactivate the speech detection module 108. Alternately, the speech detection module 108 may communicate the score to the power management module 120, whereupon the power management module 120 may determine whether to activate the speech processing module 110 or deactivate the speech detection module 108.

The speech processing module 110 may process the audio input to determine whether a keyword is included in the speech. In some embodiments, the speech processing module 110 includes a microprocessor configured to detect a keyword in the speech, such as a wakeword or sleepword. The speech processing module 110 may be configured to detect the keyword using HMM techniques, GMM techniques, or other speech recognition techniques.

The speech processing module 110 may be able to separate speech that incidentally includes a keyword from a deliberate utterance of the keyword by determining whether the keyword was spoken immediately before or after one or more other phonemes or words. For example, if the keyword is "ten," the speech processing module 110 may be able to distinguish the user saying "ten" by itself from the user saying "ten" incidentally as part of the word "Tennessee," the word "forgotten," the word "stent," or the phrase "ten bucks."

The speech processing module 110 may further be configured to determine whether the speech is associated with a particular user of a computing device in which the power management subsystem 100 is included, or whether the speech corresponds to background noise; audio from a television; music; or the speech of a person other than the user, among other classifications. This functionality may be implemented by techniques such as linear classifiers, support vector machines, and decision trees, among other techniques for classifying audio input.

Using any of the techniques described above, the speech processing module 110 may determine a score or confidence level whose value corresponds to a likelihood that a keyword is actually present in the speech. If the score satisfies a threshold, the speech processing module 110 may determine that the keyword is present in the speech. However, if the score does not satisfy the threshold, the speech processing module 110 may determine that there is no keyword in the speech.

The speech processing module 110 may communicate its determination as to whether a keyword is present in the speech to the power management module 120. If the keyword is present in the speech and the keyword is a wakeword, the power management module 120 may activate application processing module 112 and the network interface module 206 (alternately, the speech processing module 110 may communicate directly with these other modules). If the keyword is not present in the audio input (or the keyword is a sleepword), the power management module 120 may deactivate the speech processing module 110 and the speech detection module 108. Alternately, the speech processing module 110 may communicate the score to the power management module 120, whereupon the power management module 120 may determine whether to activate the application processing module 112 and the network interface module 206 or deactivate the speech processing module 110 and the speech detection module 108. In some embodiments, these activations and/or deactivations only occur if the speech processing module 110 determines that a particular user spoke the speech that includes the keyword.

The application processing module 112 may include a microprocessor configured to implement a speech recognition application provided with a computing device in which the power management subsystem is included. The speech recognition application may include any application for which speech recognition may be desirable, such as a dictation application, a messaging application, an intelligent agent frontend application, or any other application. The speech recognition application may also be configured to format the speech (e.g., by compressing the speech) for transmission over a network to a remote computing device, such as a speech recognition server.

In some embodiments, the application processing module 112 includes a dedicated microprocessor for implementing the speech recognition application. In other embodiments, the application processing module 112 includes a general-purpose microprocessor that may also implement other software provided with a computing device in which the power management subsystem 100 is included, such as the processing unit 202 shown in FIG. 2, which is discussed further below.

The network interface module 206, when activated, may provide connectivity over one or more wired or wireless networks. Upon its activation, the network interface module 206 may transmit the received audio input recorded to the memory buffer module 104 over a network to a remote computing device, such as a speech recognition server. The remote computing device may return recognition results (e.g., a transcription or response to an intelligent agent query) to the computing device in which the network interface module 206 is included, whereupon the network interface module 206 may provide the received recognition results to the application processing module 112 for processing. The network interface module 206 is discussed further below with respect to FIG. 2.

The modules of the power management subsystem 100 may be combined or rearranged without departing from the scope of the present disclosure. The functionality of any module described above may be allocated among multiple modules, or combined with a different module. As discussed above, any or all of the modules may be embodied in one or more integrated circuits, one or more general-purpose microprocessors, or in one or more special-purpose digital signal processors or other dedicated microprocessing hardware. One or more modules may also be embodied in software implemented by a processing unit 202 included in a computing device, as discussed further below with respect to FIG. 2. Further, one or more of the modules may be omitted from the power management subsystem 100 entirely.

Figure 2:
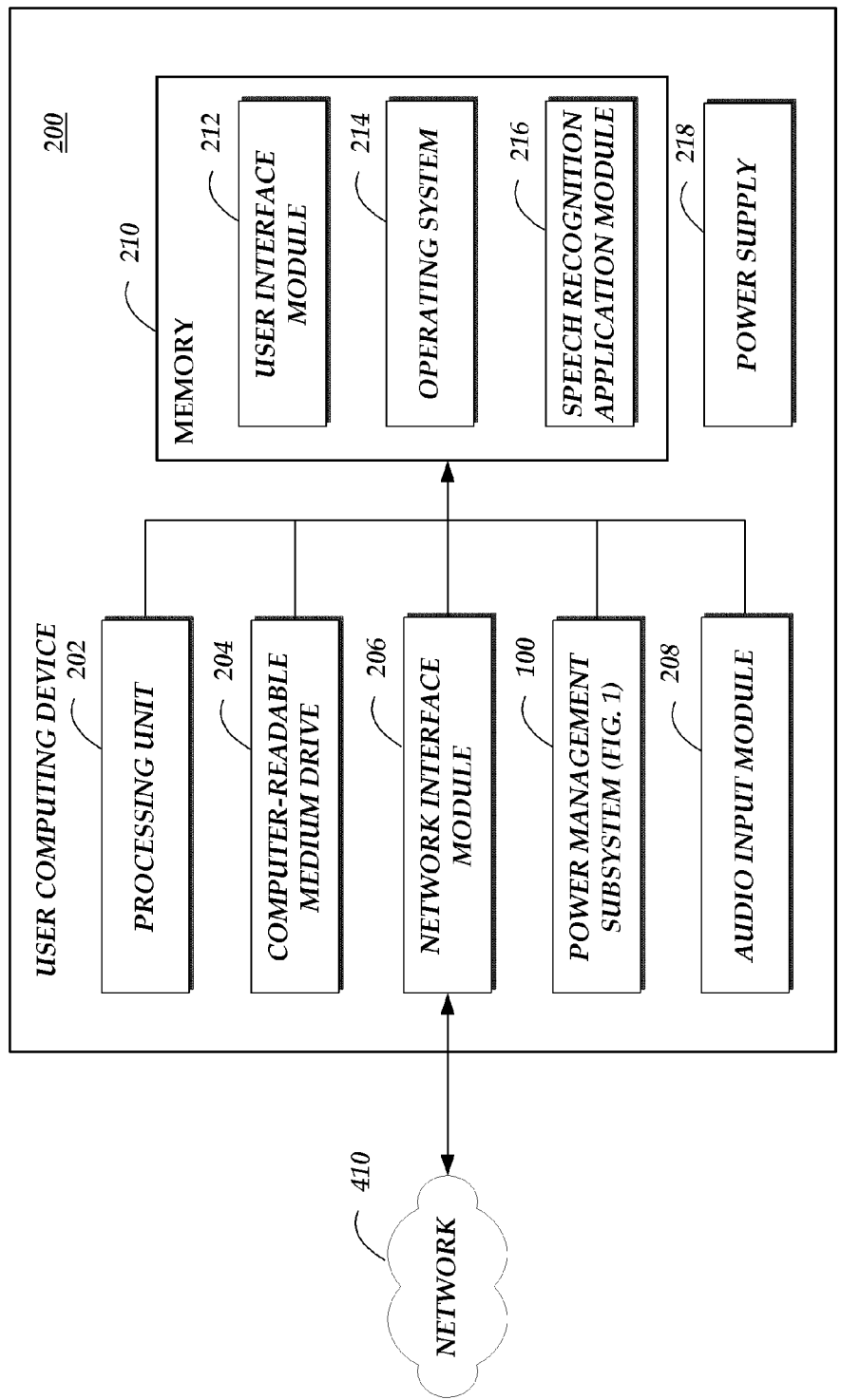
FIG. 2 is a schematic diagram depicting an illustrative user computing device including a power management subsystem.

Turning now to FIG. 2, a user computing device 200 in which a power management subsystem 100 may be included is illustrated. The user computing device 200 includes a processing unit 202; a non-transitory computer-readable medium drive 204; a network interface module 206; the power management subsystem 100 as shown in FIG. 1; and an audio input module 208, all of which may communicate with one another by way of a communication bus. The user computing device 200 may also include a power supply 218, which may provide power to the various components of the user computing device 200, such as the processing unit 202; the non-transitory computer-readable medium drive 204; the network interface module 206; the power management subsystem 100 as shown in FIG. 1; and the audio input module 208.

The processing unit 202 may include one or more general-purpose microprocessors configured to communicate to and from the memory 210 to implement various software modules stored therein, such as a user interface module 212, operating system 214, and speech recognition application module 216. The processing unit 202 may also communicate with the power management subsystem 100 and may further implement any modules of the power management subsystem 100 embodied in software. Accordingly, the processing unit 202 may be configured to implement any or all of the audio detection module 106; the speech detection module 108; the speech processing module 110; the application processing module 112; and the power management module 120. Further, the processing unit 202 may be configured to implement on-device automatic speech recognition capabilities that may be provided with the user computing device 200.

The memory 210 generally includes RAM, ROM, and/or other persistent or non-transitory computer-readable storage media. The user interface module 212 may be configured to present a user interface via a display of the user computing device 200 (not shown). The user interface module 212 may be further configured to process user input received via a user input device (not shown), such as a mouse, keyboard, touchscreen, keypad, etc. The user interface presented by the user interface module 212 may provide a user with the opportunity to customize the operation of the power management subsystem 100 and/or other operations implemented by the user computing device 200. An example of a user interface is discussed further below with respect to FIG. 5. The memory 210 may additionally store an operating system 214 that provides computer program instructions for use by the processing unit 202 in the general administration and operation of the user computing device 200. The memory 210 can further include computer program instructions that the application processing module 112 and/or processing unit 202 executes in order to implement one or more embodiments of a speech recognition application module 216. As discussed above, the speech recognition application module 216 may be any application that may use speech recognition results, such as a dictation application; a messaging application; an intelligent agent application frontend; or any other application that may advantageously use speech recognition results. In some embodiments, the memory 210 may further include an automatic speech recognition engine (not shown) that may be implemented by the processing unit 202.

The non-transitory computer-readable medium drive 204 may include any electronic data storage known in the art. In some embodiments, the non-transitory computer-readable medium drive 204 stores one or more keyword models (e.g., wakeword models or sleepword models) to which an audio input may be compared by the power management subsystem 100. The non-transitory computer-readable medium drive 204 may also store one or more acoustic models and/or language models for implementing any on-device speech recognition capabilities of the user computing device 200. Further information regarding language models and acoustic models may be found in U.S. patent application Ser. No. 13/587,799, entitled "DISCRIMINATIVE LANGUAGE MODEL PRUNING," filed on Aug. 16, 2012; and in U.S. patent application Ser. No. 13/592,157, entitled "UNSUPERVISED ACOUSTIC MODEL TRAINING," filed on Aug. 22, 2012. The disclosures of both of these applications are hereby incorporated by reference in their entireties.

The network interface module 206 may provide the user computing device 200 with connectivity to one or more networks, such as a network 410, discussed further below with respect to FIG. 4A, FIG. 4B, and FIG. 4C. The processing unit 202 and the power management subsystem 100 may thus receive instructions and information from remote computing devices that may also communicate via the network 410, such as a speech recognition server 420, as also discussed further below. In some embodiments, the network interface module 206 comprises a wireless network interface that provides the user computing device 200 with connectivity over one or more wireless networks.

In some embodiments, the network interface module 206 is selectively activated. While the network interface module 206 is in a deactivated or "sleeping" state, it may provide limited or no connectivity to networks or computing systems so as to conserve power. In some embodiments, the network interface module 206 is in a deactivated state by default, and becomes activated responsive to a signal from the power management subsystem 100. While the network interface module 206 in an activated state, it may provide a relatively greater amount of connectivity to networks or computing systems, such that the network interface module 206 enables the user computing device 200 to send audio input to a remote computing device and/or receive a keyword confirmation, speech recognition result, or deactivation instruction from the remote computing device, such as a speech recognition server 420.

In a particular, non-limiting example, the network interface module 206 may be activated responsive to the power management subsystem 100 determining that an audio input includes a wakeword. The power management subsystem 100 may cause transmission of the audio input to a remote computing device (such as a speech recognition server 420) via the activated network interface module 206. Optionally, the power management subsystem 100 may obtain a confirmation of a wakeword from a remote computing device before causing the transmission of subsequently received audio inputs to the remote computing device. The power management subsystem 100 may later deactivate the activated network interface module 206 in response to receiving a deactivation instruction from the remote computing device, in response to determining that at least a predetermined amount of time has passed since an audio input satisfying an energy level threshold has been obtained, or in response to receiving an audio input that includes a sleep-word.

The audio input module 208 may include an audio input device, such as a microphone or array of microphones, whether analog or digital. The microphone or array of microphones may be implemented as a directional microphone or directional array of microphones. In some embodiments, the audio input module 208 receives audio and provides the audio to the power management subsystem 100 for processing, substantially as discussed above with respect to FIG. 1. The audio input module 208 may also receive instructions from the power management subsystem 100 to set a sampling rate (whether in frame rate or bitrate) for obtaining audio. The audio input module 208 may also (or instead) include one or more piezoelectric elements and/or micro-electrical-mechanical systems (MEMS) that can convert acoustic energy to an electrical signal for processing by the power management subsystem 100. The audio input module 208 may further be provided with amplifiers, rectifiers, and other audio processing components as desired.

One or more additional input devices such as light sensors, position sensors, image capture devices, or the like may be provided with the user computing device 200. Such additional input devices are not shown in FIG. 2 so as not to obscure the principles of the present disclosure. In some embodiments, an additional input device may detect the occurrence or non-occurrence of a condition. Information pertaining to such conditions may be provided to the power management subsystem 100 to determine whether one or more components of the user computing device 200 or the power management subsystem 100 should be activated or deactivated. In one embodiment, the additional input device includes a light sensor configured to detect a light level. The power management module 120 may only act network interface module 206 may only be activated if the light level detected by the light sensor does not satisfy a threshold. In another embodiment, the additional input device includes an image capture device configured with facial recognition capabilities. In this embodiment, the network interface module 206 may only be activated if the image capture device recognizes the face of a user associated with the user computing device 200. More information on controlling speech recognition capabilities with input devices may be found in U.S. patent application Ser. No. 10/058,730, entitled "AUTOMATIC SPEECH RECOGNITION SYSTEM AND METHOD," filed on Jan. 30, 2002, which published as U.S. Patent Pub. No. 2003/0144844 on Jul. 31, 2003, the disclosure of which is hereby incorporated by reference in its entirety. Further information on controlling speech recognition capabilities may be found in U.S. Pat. No. 8,326,636, entitled "USING A PHYSICAL PHENOMENON DETECTOR TO CONTROL OPERATION OF A SPEECH RECOGNITION ENGINE," which issued on Dec. 4, 2012. The disclosure of this patent is also hereby incorporated by reference in its entirety.

Still further input devices may be provided, which may include user input devices such as mice, keyboards, touch-screens, keypads, etc. Likewise, output devices such as displays, speakers, headphones, etc. may be provided. In a particular example, one or more output devices configured to present speech recognition results in audio format (e.g., via text-to-speech) or in visual format (e.g., via a display) may be included with the user computing device 200. Such input and output devices are well known in the art and need not be discussed in further detail herein, and are not shown in FIG. 2 so as to avoid obscuring the principles of the present disclosure.

The power supply 218 may provide power to the various components of the user computing device 200. The power supply 218 may include a wireless or portable power supply, such as a disposable or rechargeable battery or battery pack; or may include a wired power supply, such as an alternating current (AC) power supply configured to be plugged into an electrical outlet. In some embodiments, the power supply 218 communicates the level of power that it can supply to the power management subsystem 100 (e.g., a percentage of battery life remaining, whether the power supply 218 is plugged into an electrical outlet, etc.). In some embodiments, the power management subsystem 100 selectively activates or deactivates one or more modules based at least in part on the power level indicated by the power supply. For example, if the user computing device 200 is plugged in to an electrical outlet, the power management subsystem 100 may activate the network interface module 206 and leave it in an activated state. If the user computing device 200 is running on battery power, the power management subsystem 100 may selectively activate and deactivate the network interface module 206 as discussed above.

Figure 3:
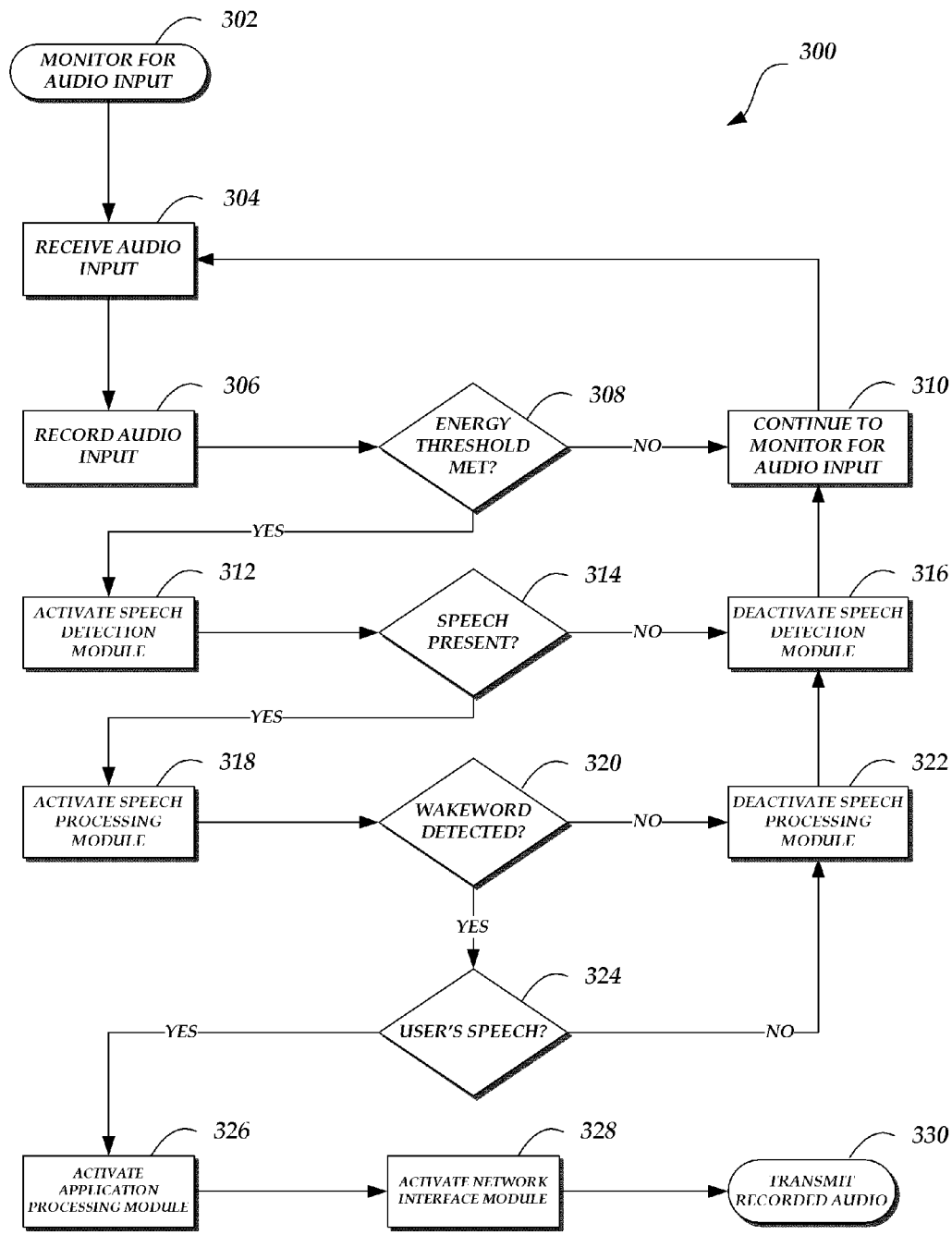
FIG. 3 is flow diagram depicting an illustrative routine for speech recognition power management which may be implemented by the power management subsystem of FIG. 1.

Turning now to FIG. 3, an illustrative routine 300 is shown in which modules of the power management subsystem 100 may be selectively activated for processing an audio input. The illustrative routine 300 represents an escalation of processing and/or power consumption, as modules that are activated later in the illustrative routine 300 may have relatively greater processing requirements and/or power consumption.

The illustrative routine 300 may begin at block 302 as the audio input module 208 monitors for audio input. The audio input module 208 may receive an audio input at block 304. At block 306, the received audio input may be recorded to the memory buffer module 104. At block 308, the audio detection module 106 may determine whether the audio input has an energy level that satisfies an energy level threshold (and, optionally, whether the audio input has an energy level that satisfies an energy level threshold for at least a threshold duration). If the audio input's energy level does not satisfy the energy level threshold, the audio input module 208 may continue to monitor for audio input in block 310 until another audio input is received.

Returning to block 308, if the audio detection module 106 determines that the audio input has an energy level satisfying a threshold, the power management module 120 may activate the speech detection module 108 at block 312 (alternately, the audio detection module 106 may directly activate the speech detection module 108, and the power management module 120 may be omitted as well in the following blocks). At block 314, the speech detection module 108 may determine whether speech is present in the obtained audio input, substantially as discussed above with respect to FIG. 1. If the speech detection module 108 determines that speech is not present (or not likely to be present) in the audio input, the power management module 120 may deactivate the speech detection module 108 at block 316. The audio input module 208 may then continue to monitor for audio input in block 310 until another audio input is received.

Returning to block 314, if the speech detection module 108 determines that the audio input includes speech, the power management module 120 may activate the speech processing module 110 at block 318. As discussed above, the speech processing module 110 may determine whether a wakeword is present in the speech at block 320. If the speech processing module 110 determines that the wakeword is not present in the speech (or not likely to be present in the speech), the speech processing module 110 may be deactivated at block 322. The speech detection module 108 may also be deactivated at block 316. The audio input device 208 may then continue to monitor for audio input in block 310 until another audio input is received.

Returning to block 320, if in some embodiments, the speech processing module 110 determines that the wakeword is present in the speech, user 401 the speech processing module 110 optionally determines in block 324 whether the speech is associated with a particular user (e.g., whether the wakeword was spoken by the user), substantially as discussed above with respect to FIG. 1. If the speech is not associated with the particular user, the speech processing module 110 may be deactivated at block 322. The speech detection module 108 may also be deactivated at block 316. The audio input device 208 may then continue to monitor for audio input in block 310 until another audio input is received. If the speech is associated with the particular user, the illustrative routine 300 may proceed to block 326. In other embodiments, block 324 may be omitted, and the illustrative routine 300 may proceed directly from block 320 to block 326 responsive to the speech processing module 110 determining that a wakeword is present in the speech.

At block 326, the power management module 120 may activate the application processing module 112, which may implement the speech recognition application module 216 shown in FIG. 2. The power management module 120 may also activate the network interface module 206 at block 328. With the network interface module 206 activated, the audio input recorded to the memory buffer module 104 may be transmitted over a network via the network interface module 206. In some embodiments, while the network interface module 206 is active, subsequently obtained audio inputs are provided from the audio input module 208 directly to the application processing module 112 and/or the network interface module 206 for transmission to the remote computing device. However, in other embodiments, any or all of the speech detection module 108, speech processing module 110, and application processing module 112 process the audio input before providing it to the network interface module 206 to be transmitted over the network 410 to a remote computing device.

In some embodiments, not shown, the power management subsystem 100 waits until the remote computing device returns a confirmation that the wakeword is present in the first audio input to transmit subsequent audio inputs for recognition. If no confirmation of the wakeword is provided by the remote computing device, or if a deactivation instruction is received via the network interface module 206, the network interface module 206 and one or more modules of the power management subsystem 100 may be deactivated.

As many of the operations of the power management subsystem 100 may generate probabilistic rather than exact determinations, errors may occur during the illustrative routine 300. In some instances, a particular module of the power management subsystem 100 may provide a "false positive," causing one or more modules to be incorrectly activated. For example, the speech detection module 108 may incorrectly determine that speech is present at block 314, or the speech processing module 110 may incorrectly determine that the speech includes the wakeword at block 320 or that the speech belongs to the user at block 324. Adaptive thresholding and cross-validation among the modules of the power management subsystem 100 may be advantageously used to reduce false positives. Two examples of adaptive thresholding are discussed herein, but other types of adaptive thresholding are possible. As discussed above, the speech detection module may determine that speech is present in an audio input at block 314. However, the speech processing module 110, which may recognize speech more precisely than the speech detection module 108 owing to its superior processing power, may determine that in fact no speech is present in the audio input. Accordingly, the speech processing module 110 may direct the speech detection module 108 to increase its score threshold for determining that speech is present in the audio input, so as to reduce future false positives. Likewise, if the remote computing device (such as a speech recognition server 420) includes speech recognition capabilities, the remote computing device may transmit to the user computing device 200 an indication that no wakeword was present in the speech, even though the speech processing module 110 may have indicated that the wakeword was present. Accordingly, the score threshold of the speech processing module 110 for determining that the wakeword is present in the speech may be increase, so as to reduce future false positives. Further, a user interface may be provided so that a user may increase one or more score thresholds to reduce false positives, as further described below with respect to FIG. 5.

In other instances, a particular component may provide a "false negative," such that components of the power management subsystem 100 are not activated and/or the network interface module 206 is not activated, even though the user has spoken the wakeword. For example, the speech detection module 108 may incorrectly determine that no speech is present at block 314, or the speech processing module 110 may incorrectly determine that the speech does not include the wakeword at block 320 or that the speech does not belong to the user at block 324. To reduce the likelihood of false negatives, the power management subsystem 100 may periodically lower the threshold scores, e.g., lower the score required to satisfy the thresholds in blocks 314, 320, and/or 324. The threshold may continue to be lowered until one or more false positives are obtained, as described above. Once one or more false positives are obtained, the threshold may not be lowered further, or may be slightly increased. Further, a user interface may accordingly be provided so that a user may decrease one or more score thresholds to reduce false negatives, as further described below with respect to FIG. 5.

In some embodiments, not all activated components are deactivated if a negative result is obtained at any of blocks 314, 320, or 324. For example, if a wakeword is not recognized at block 320, the speech processing module 110 may be deactivated at block 322, but the speech detection module 108 may remain activated. Additionally, blocks may be skipped in some implementations. In some embodiments, a score satisfying a threshold at either of blocks 314 or 320 prompts one or more subsequent blocks to be skipped. For example, if the speech processing module 110 determines with very high confidence that the wakeword is present in the speech at block 320, the illustrative routine 300 may skip directly to block 326

Further, in some embodiments, the user computing device 200 may include an automatic speech recognition engine configured to be executed by the processing unit 202. As such on-device speech recognition may have especially high power consumption, the processing unit 202 may only implement the automatic speech recognition engine to recognize speech responsive to the speech processing module 110 determining that the wakeword has been spoken by a user.

Figure 4B:
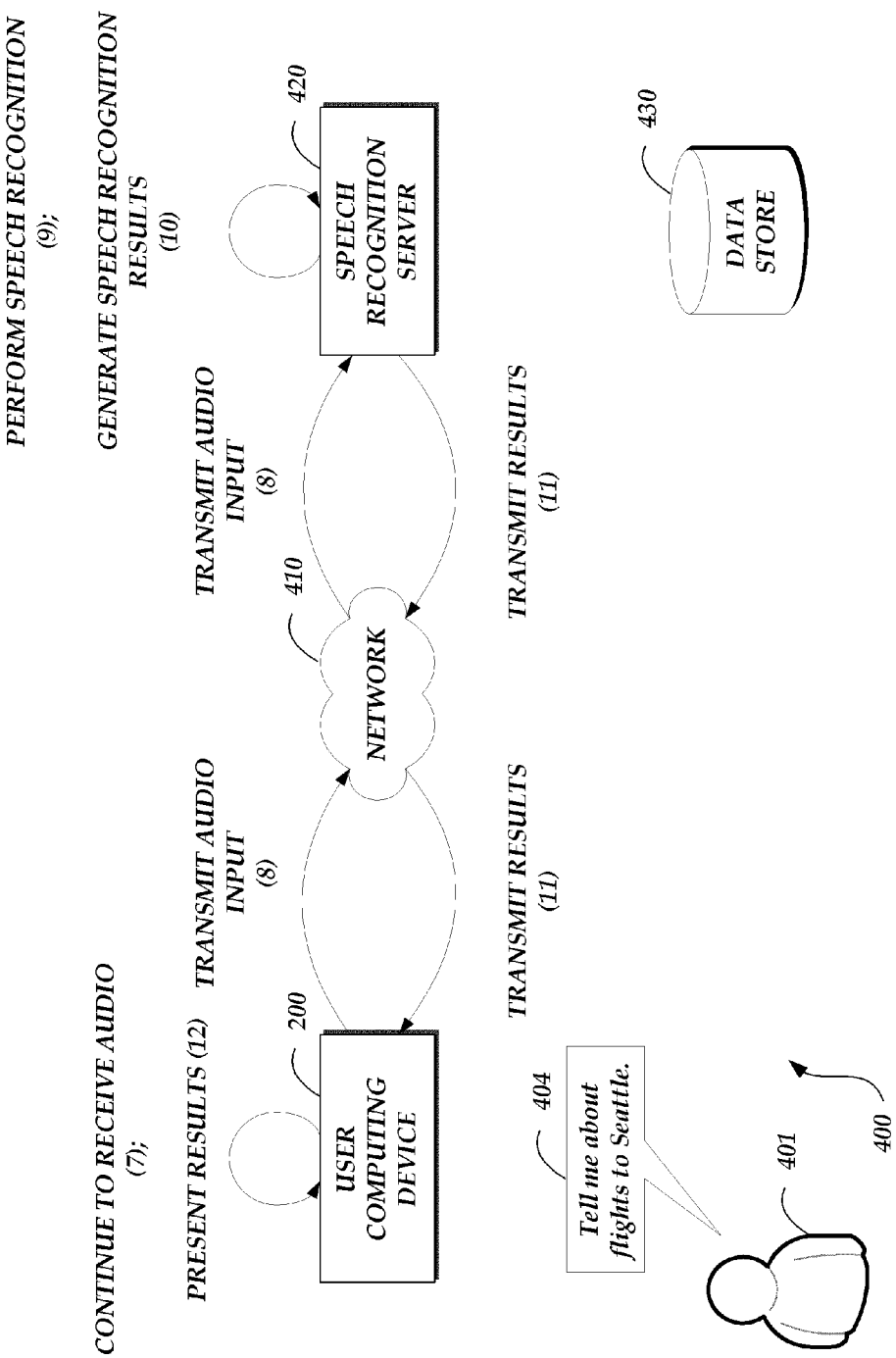
Figure 4C:
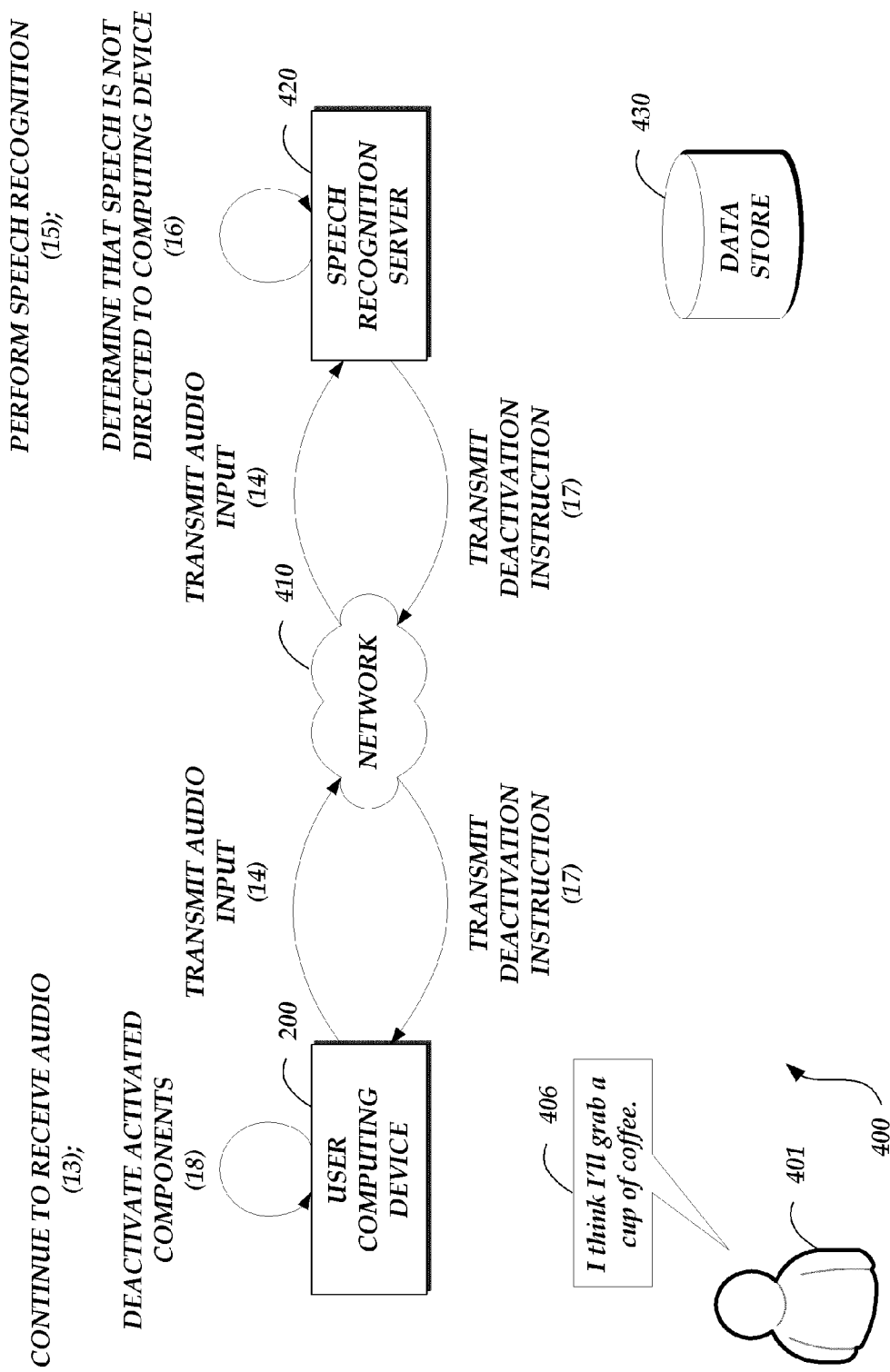

With reference now to FIG. 4A, FIG. 4B, and FIG. 4C, example operations of a distributed speech recognition service are shown in the illustrative environment 400. The environment 400 may include a user 401; a user computing device 200 as described above; a network 410; a speech recognition server 420; and a data store 430.

The network 410 may be any wired network, wireless network or combination thereof. In addition, the network 410 may be a personal area network, local area network, wide area network, cable network, satellite network, cellular telephone network, or combination thereof. Protocols and devices for communicating via the Internet or any of the other aforementioned types of communication networks are well known to those skilled in the art of computer communications, and thus need not be described in more detail herein.

The speech recognition server 420 may generally be any computing device capable of communicating over the network 410. In some embodiments, the speech recognition server 420 is implemented as one or more server computing devices, though other implementations are possible. The speech recognition server 420 may be capable of receiving audio input over the network 410 from the user computing device 200. This audio input may be processed in a number of ways, depending on the implementation of the speech recognition server 420. In some embodiments, the speech recognition server 420 processes the audio input received from the user computing device 200 to confirm that a wakeword is present (e.g., by comparing the audio input to a known model of the wakeword), and transmits the confirmation to the user computing device 200. The speech recognition server 420 may further be configured to identify a user 401 that spoke the wakeword using known speaker identification techniques.

The speech recognition server 420 may process the audio input received from the user computing device 200 to determine speech recognition results from the audio input. For example, the audio input may include a spoken query for an intelligent agent to process; speech to be transcribed to text; or other speech suitable for a speech recognition application. The speech recognition server 420 may transmit the speech recognition results over the network 410 to the user computing device 200. Further information pertaining to distributed speech recognition applications may be found in U.S. Pat. No. 8,117,268, entitled "Hosted voice recognition system for wireless devices" and issued on Feb. 14, 2012, the disclosure of which is hereby incorporated by reference in its entirety.

The speech recognition server 420 may be in communication either locally or remotely with a data store 430. The data store 430 may be embodied in hard disk drives, solid state memories, and/or any other type of non-transitory, computer-readable storage medium accessible to the speech recognition server 420. The data store 430 may also be distributed or partitioned across multiple storage devices as is known in the art without departing from the spirit and scope of the present disclosure. Further, in some embodiments, the data store 430 is implemented as a network-based electronic storage service.

The data store 430 may include one or more models of wakewords. In some embodiments, a wakeword model is specific to a user 401, while in other embodiments, the Upon receiving an audio input determined by the user computing device 200 to include a wakeword, the speech recognition server may compare the audio input to a known model of the wakeword stored in the data store 430. If the audio input is sufficiently similar to the known model, the speech recognition server 420 may transmit a confirmation of the wakeword to the user computing device 200, whereupon the user computing device 200 may obtain further audio input to be processed by the speech recognition server 420.

The data store 430 may also include one or more acoustic and/or language models for use in speech recognition. These models may include general-purpose models as well as specific models. Models may be specific to a user 401; to a speech recognition application implemented by the user computing device 200 and/or the speech recognition server 420; or may have other specific purposes. Further information regarding language models and acoustic models may be found in U.S. patent application Ser. No. 13/587,799, entitled "DISCRIMINATIVE LANGUAGE MODEL PRUNING," filed on Aug. 16, 2012; and in U.S. patent application Ser. No. 13/592,157, entitled "UNSUPERVISED ACOUSTIC MODEL TRAINING," filed on Aug. 22, 2012. The disclosures of both of these applications were previously incorporated by reference above.

The data store 430 may further include data that is responsive to a query contained in audio input received by the speech recognition server 420. The speech recognition server 420 may recognize speech included in the audio input, identify a query included in the speech, and process the query to identify responsive data in the data store 430. The speech recognition server 420 may then provide an intelligent agent response including the responsive data to the user computing device 200 via the network 410. Still further data may be included in the data store 430.

It will be recognized that many of the devices described above are optional and that embodiments of the environment 400 may or may not combine devices. Furthermore, devices need not be distinct or discrete. Devices may also be reorganized in the environment 400. For example, the speech recognition server 420 may be represented as a single physical server computing device, or, alternatively, may be split into multiple physical servers that achieve the functionality described herein. Further, the user computing device 200 may have some or all of the speech recognition functionality of the speech recognition server 420.

Additionally, it should be noted that in some embodiments, the user computing device 200 and/or speech recognition server 420 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. One or more of the computing devices of the hosted computing environment may include a power management subsystem 100 as discussed above.

With specific reference to FIG. 4A, an illustrative operation by which a wakeword may be confirmed is shown. The user 401 may speak the wakeword 502. The user computing device 200 may obtain the audio input that may include the user's speech (1) and determine that the wakeword 402 is present in the speech (2), substantially as discussed above with respect to FIG. 3. The audio input may also include a voice command or query. Responsive to determining that the speech includes the wakeword, the application processing module 112 and the network interface module 206 of the user computing device 200 may be activated (3) and the audio input transmitted (4) over the network 410 to the speech recognition server 420. The speech recognition server 420 may confirm (5) that the wakeword is present in the audio input, and may transmit (6) a confirmation to the user computing device 200 over the network 410.

Turning now to FIG. 4B, responsive to receiving the confirmation of the wakeword from the speech recognition server 420, the user computing device 200 may continue to obtain audio input (7) to be provided to the speech recognition server 420 for processing. For example, the obtained audio input may include an intelligent agent query 404 for processing by the speech recognition server 420. Alternately, the obtained audio input may include speech to be transcribed by the speech recognition server 420 (e.g., for use with a dictation, word processing, or messaging application executed by the application processing module 112). The user computing device 200 may transmit the audio input (8) over the network 410 to the speech recognition server 420. Optionally, an identifier of the speech recognition application for which speech recognition results are to be generated may be provided to the speech recognition server 420, so that the speech recognition server 420 may generate results specifically for use with the speech recognition application implemented by the application processing module 112. The speech recognition server 420 may recognize speech (9) included in the audio input and generate speech recognition results (10) therefrom. The speech recognition results may include, for example, a transcription of the speech, an intelligent agent response to a query included in the speech, or any other type of result. These speech recognition results may be transmitted (11) from the speech recognition server 420 to the user computing device 200 over the network 410. In response to receiving the results, the application processing module 112 may cause presentation of the results (12) in audible format (e.g., via text-to-speech) or in visual format (e.g., via a display of the user computing device 200).

With reference now to FIG. 4C, the user computing device 200 may continue to obtain audio input (13) to be provided to the speech recognition server 420 for processing. The user computing device 200 may transmit the audio input (14) over the network 410 to the speech recognition server 420. The speech recognition server may recognize any speech (15) included in the audio input. Responsive to recognizing the speech, the speech recognition server 420 may determine that the user 401 is no longer speaking to the user computing device 200 and stop (16) any subsequent speech recognition. For example, the user 401 may speak words that do not correspond to a structured command or query, such as undirected natural language speech 406. The speech recognition server 420 may also analyze the speech's speed, carefulness, inflection, or clarity to determine that the speech is not directed to the user computing device 200 and should not be processed into speech recognition results.

Other types of audio inputs may also prompt the speech recognition server 420 to stop subsequent speech recognition. Alternately, the speech recognition server 420 may determine that the received audio input does not include speech. Responsive to receiving one or more audio inputs that do not include speech directed to the user computing device 200, the speech recognition server 420 may determine that speech recognition results should not be generated and that the speech recognition should stop. Further, the audio input may include a predetermined sleepword, which may be selected by the user 401. If the speech recognition server 420 detects the sleepword, the speech recognition server 420 may stop performing speech recognition on the audio input. Further, the speech recognition server 420 may determine that multiple users 401 are present in the vicinity of the user computing device 200 (e.g., by performing speaker identification on multiple audio inputs obtained by the user computing device 200). If the number of identified users 401 satisfies a threshold (which may be any number of users 401 greater than one), the speech recognition server 420 may determine that any audio inputs obtained by the user computing device 200 are not likely intended to be processed into speech recognition results.

Responsive to determining that the speech of the user 401 is not directed to the user computing device 200 (or determining that subsequent speech recognition should not be performed for any of the other reasons discussed above), the speech recognition server 420 may transmit a deactivation instruction (17) over the network 410 to the user computing device 200. In response to receiving the deactivation instruction, the user computing device 200 may deactivate (18) its network interface module 206 and one or more components of the power management subsystem 100, such as the application processing module 112, the speech processing module 110, and/or the speech detection module 108. Other conditions may also prompt the speech recognition server 420 to transmit the deactivation instruction to the user computing device 200. For example, returning to FIG. 4A, if the speech recognition server 420 determines that a wakeword is not present in the audio input received at state (1), the speech recognition server 420 may transmit a deactivation instruction to the user computing device 200. Alternately, the speech recognition server 420 may determine that a threshold amount of time has passed since it last received an audio input including speech from the user computing device 200, and may accordingly transmit a deactivation instruction to the user computing device 200. Still other criteria may be determined for transmitting a deactivation instruction to the user computing device 200.

Returning again to FIG. 4A, upon receiving a subsequent audio input determined to include a wakeword, the user computing device 200 may activate the components of the power management subsystem 100 and the network interface module 206 and transmit the audio input to the speech recognition server 420. The example operations shown herein may thus repeat themselves.

The example operations depicted in FIG. 4A, FIG. 4B, and FIG. 4C are provided for illustrative purposes. One or more states may be omitted from the example operations shown herein, or additional states may be added. In a particular example, the user computing device 200 need not obtain a confirmation of the wakeword from the speech recognition server 420 before transmitting an audio input for which speech recognition results are to be generated by the speech recognition server 420. Additionally, the user computing device 200 need not obtain a deactivation instruction before deactivating its network interface module 206 and/or one or more of the components of its power management subsystem 100, such as the application processing module 112, speech processing module 110, or speech detection module 108. Rather, power management subsystem 100 may determine (via the audio detection module 106) that at least a threshold amount of time has passed since an audio input having an energy level satisfying an energy level threshold has been obtained by the user computing device 200. Alternately, the user computing device 200 may determine (via the speech detection module 108) that at least a threshold amount of time has passed since an audio input that includes speech has been obtained. Responsive to determining that the threshold amount of time has passed, the power management subsystem 100 may cause deactivation of the network interface module 206, and may deactivate one or more of its own components as described above with respect to FIG. 3.

Further, the power management subsystem 100 may be configured to recognize a sleepword selected and spoken by the user 401, in a manner substantially similar to how the wakeword is identified in FIG. 3. If the sleepword is detected by the power management subsystem 100 (e.g., by the speech processing module 110), the network interface module 206 and/or one or more of the components of the power management subsystem 100 may be deactivated. Likewise, if the user computing device 200 includes its own on-device speech recognition capabilities, they may be deactivated responsive to the sleepword being detected.

Figure 5:
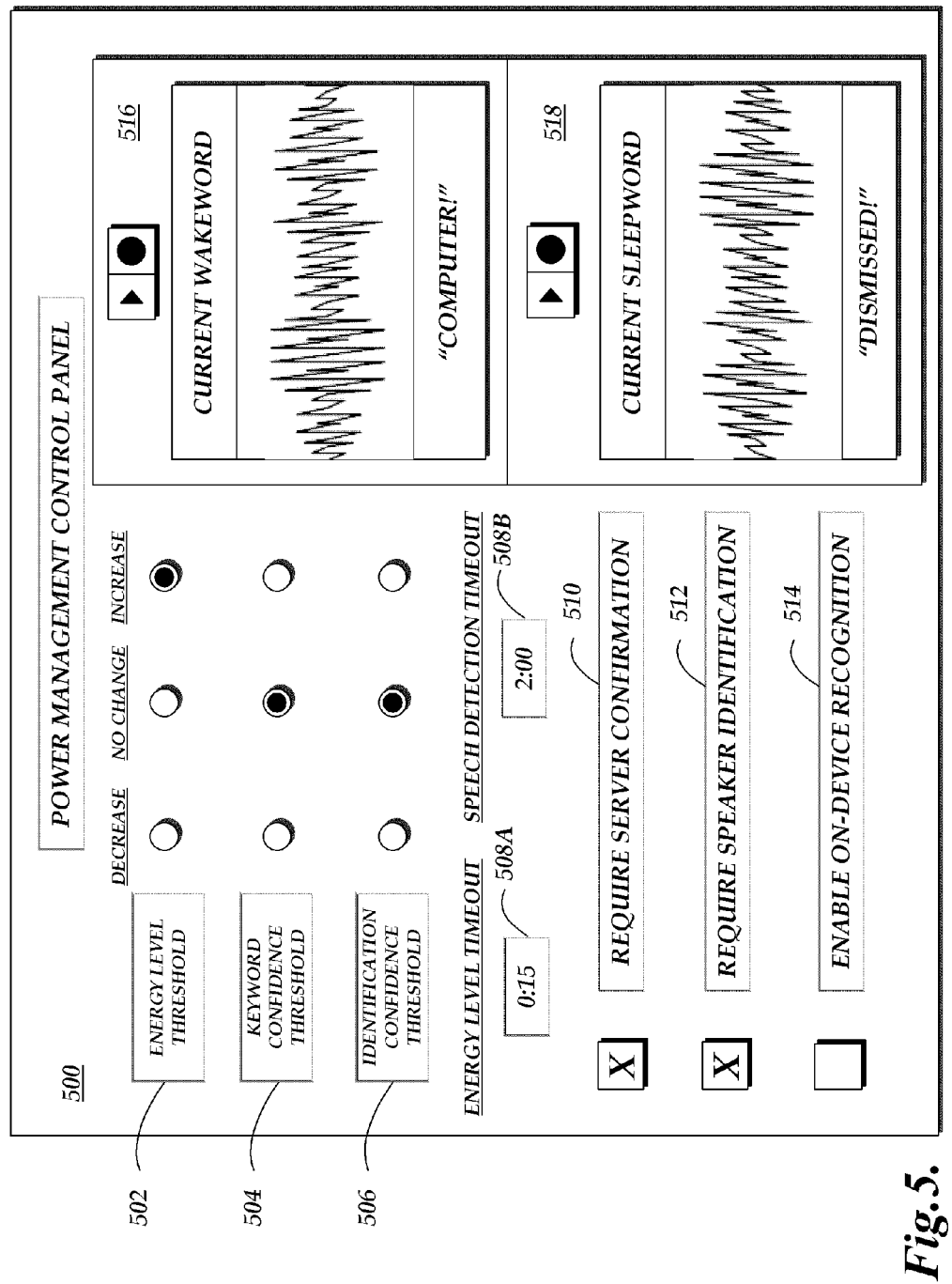
FIG. 5 is a pictorial diagram depicting an illustrative user interface that may be provided by a user computing device that includes a power management subsystem.

FIG. 5 depicts an illustrative user interface 500 that may be provided by a user computing device 200 for customizing operations of the power management subsystem 100 and of the user computing device 200. In one embodiment, the user interface module 212 processes user input made via the user interface 500 and provides it to the power management subsystem 100.

The energy level threshold element 502 may enable a user to specify a threshold energy level at which the speech detection module 108 should be activated, as shown in block 308 of FIG. 3. For example, if the user computing device 200 is in a relatively noisy environment or if the user computing device 200 is experiencing a significant number of "false positives" determined by the audio detection module 106, the user 401 may wish to increase the energy level threshold at which the speech processing module 108 is activated. If the user 401 is in a relatively quiet environment or if the user computing device 200 is experiencing a significant number of false negatives, the user 401 may wish to decrease the energy level threshold at which the speech detection module 108 is activated. As discussed above, the energy level threshold may correspond to a volume threshold, intensity threshold, amplitude threshold, or other threshold related to the audio input.

The keyword confidence threshold element 504 may enable a user to specify a threshold score at which the speech processing module 110 determines that a keyword is present. Likewise, the identification confidence threshold element may enable a user to specify a threshold score at which the speech processing module 110 determines that the user spoke the keyword. In one embodiment, the application processing module 112 and the network interface module 206 are activated responsive to the speech processing module 110 recognizing a wakeword (e.g., the speech processing module 110 determining a score that satisfies a threshold, which score corresponds to a likelihood that the wakeword is included in the speech). In another embodiment, the application processing module 112 and the network interface module 206 are activated responsive to the speech processing module 110 determining that the wakeword is associated with the user 401 with at least the threshold score corresponding to a likelihood that the wakeword is associated with the user. In a further embodiment, the application processing module 112 and the network interface module 206 are activated responsive to the speech processing module 110 both recognizing the wakeword with at least the threshold score and determining that the wakeword is associated with the user 401 with at least the threshold score. Other threshold elements may be provided to enable the user 401 to set individual thresholds for activating any or all of the individual components of the power management subsystem 100. Further threshold elements may be provided to enable the user to specify scores at which one or more blocks of the illustrative routine 300 may be skipped, substantially as discussed above with respect to FIG. 3.

The user interface 500 may further include one or more timer elements 508A and 508B. Each timer element may be used to set a threshold time interval at which the network interface module 206 and/or one or more components of the power management subsystem 100 are automatically deactivated. With reference to timer element 508A, if the power management subsystem 100 determines that at least a threshold interval of time has passed since an audio input having an energy level satisfying an energy level threshold has been obtained by the user computing device 200, the network interface module 206 may be automatically deactivated, in addition to the application processing module 112, the speech processing module 110, and the speech detection module 108 of the power management subsystem 100. Further timer elements may also be used to set a threshold time interval after which the speech recognition server 420 automatically sends a deactivation instruction to the network interface module 206 and the power management subsystem 100, substantially as discussed above with respect to FIG. 4C. Timer elements for other modules of the power management subsystem 100 may also be provided.

With continued reference to FIG. 5, the user 401 can select whether the wakeword should be confirmed by the speech recognition server 420 with server confirmation element 510. In some embodiments, the application processing module 112 and network interface module 206 only remains activated after the speech processing module 110 detects the wakeword if a confirmation of the wakeword is received from the speech recognition server 420. If the user 401 requires server confirmation of the wakeword, subsequently obtained audio inputs may not be transmitted to the speech recognition server 420 unless the wakeword is confirmed. However, as discussed above, confirmation is not necessarily required. If the user 401 does not require server confirmation of the wakeword, the user computing device 200 may transmit one or more audio inputs obtained subsequent to the speech processing module 110 detecting the wakeword in the speech and/or determining that the speech is associated with the user 401.

The user 401 may also select whether speaker identification is required with speaker identification element 512. If the user 401 requires speaker identification, the speech processing module 110 and/or the speech recognition server 420 may be used to determine whether an audio input including speech corresponding to a wakeword is associated with the user 401. The application processing module 112 and network interface module 206 may be activated responsive to the speech processing module 110 determining that the user 401 is the speaker of the speech. Likewise, the network interface module 206 may remain in an activated state responsive to receiving a confirmation from the speech recognition server 420 that the user 401 is indeed the speaker of the wakeword. If the user 401 does not require speaker identification, however, neither the speech processing module 110 nor the speech recognition server 420 need identify the speaker.

The user interface 500 may also include an on-device recognition selection element 514, wherein the user 401 may select whether the user computing device 200 generates speech recognition results by itself, or whether audio inputs are routed to the speech recognition server 420 for processing into speech recognition results. The on-device recognition selection element 514 may be optionally disabled or grayed out if the user computing device 200 does not include on-device speech recognition capabilities. Further, the on-device recognition selection element 514 may be automatically deselected (and on-device speech recognition capabilities automatically disabled) if the power supply 218 drops below a threshold power supply level (e.g., a battery charge percentage), as on-device speech recognition capabilities as implemented by the processing unit 202 and/or the application processing module 112 may require a relatively large power draw.

The wakeword pane 516 and sleepword pane 518 may include user interface elements whereby the user 401 may record and cause playback of a wakeword or sleepword spoken by the user 401. When the user 401 records a wakeword or sleepword, the network interface module 206 may be automatically activated so that the audio input including the user's speech may be provided to the speech recognition server 420. The speech recognition server 420 may return a transcription of the recorded wakeword or sleepword so that the user may determine whether the recorded wakeword or sleepword was understood correctly by the speech recognition server 420. Alternately, when the user 401 records a wakeword or sleepword, any on-device speech recognition capabilities of the user computing device 200 may be activated to transcribe the recorded speech of the user 401. A spectral representation of the spoken wakeword or sleepword may also be provided by the user interface 500. Optionally, the wakeword pane 516 and sleepword pane 518 may include suggestions for wakewords or sleepwords, and may also indicate a quality of a wakeword or sleepword provided by the user 401, which quality may reflect a likelihood that the wakeword or sleepword is to produce false positive or false negative. Further information regarding suggesting keywords may be found in U.S. patent application Ser. No. 13/670,316, entitled "WAKE WORD EVALUATION," which was filed on Nov. 6, 2012. The disclosure of this application is hereby incorporated by reference in its entirety.

Various aspects of the present disclosure have been discussed as hardware implementations for illustrative purposes. However, as discussed above, the power management subsystem 100 may be partially or wholly implemented by the processing unit 202. For example, some or all of the functionality of the power management subsystem 100 may be implemented as software instructions executed by the processing unit 202. In a particular, non-limiting example, the functionality of the speech processing module 110, the application processing module 112, and the power management module 120 may be implemented as software executed by the processing unit 202. The processing unit 202 may accordingly be configured to selectively activate and/or deactivate the network interface module 206 responsive to detecting a wakeword. Still further implementations are possible.

Depending on the embodiment, certain acts, events, or functions of any of the routines or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a network interface component;
   an audio input component configured to receive an audio input; and
   one or more processors configured to:
     determine that an energy level of the audio input satisfies a threshold;
     determine, in response to determining that the energy level satisfies the threshold, that the audio input likely comprises data representing an utterance;
     determine, in response to determining that the audio input likely comprises data representing the utterance, that the audio input likely comprises data representing a wakeword indicative of device-directed speech; and
     cause transmission of the audio input by the network interface component in response to determining that the audio input likely comprises data representing the wakeword;
   wherein the network interface component is configured to:
     transmit the audio input to a remote computing system;
     receive speech recognition results from the remote computing system;
     receive confirmation data from the remote computing system, wherein the confirmation data indicates that the audio input likely comprises data representing the wakeword;
     transmit a subsequent audio input to the remote computing system based at least partly on receiving the confirmation data; and
     receive subsequent speech recognition results from the remote computing system.

2. The system of claim 1, wherein the one or more processors are further configured to determine the energy level of the audio input using at least one of: a volume of the audio input, an intensity of the audio input, or an amplitude of the audio input.

3. The system of claim 1, wherein the one or more processors comprise a first digital signal processor and a second digital signal processor, wherein the first digital signal processor is configured to activate the second digital signal processor in response to determining that the energy level satisfies the threshold, and wherein the second digital signal processor determines that the audio input likely comprises data representing the utterance.

4. The system of claim 1, wherein the one or more processors comprise a digital signal processor and a microprocessor, wherein the digital signal processor is configured to activate the microprocessor in response to determining that the audio input likely comprises data representing the utterance, and wherein the microprocessor determines that the audio input likely comprises data representing the wakeword.

5. The system of claim 1, wherein the one or more processors are further configured to cause presentation of audio output using the speech recognition results, wherein the speech recognition results comprise audio data representing a response to the utterance.

6. The system of claim 1, wherein the one or more processors are further configured to determine a response to the utterance using the speech recognition results, wherein the speech recognition results comprise a transcription of the utterance.

7. A computer-implemented method comprising:
   under control of a computing system configured to execute specific computer-executable instructions,
     receiving an audio input;
     determining that an energy level of the audio input satisfies a threshold;
     in response to determining that the energy level satisfies the threshold, determining that the audio input likely comprises data representing an utterance;
     in response to determining that audio input likely comprises data representing the utterance, determining that the audio input likely comprises data representing a wakeword indicative of device-directed speech;
     in response to determining that the audio input likely comprises data representing the wakeword, transmitting the audio input to a remote computing system;
     receiving speech recognition results from the remote computing system;
     receiving confirmation data from the remote computing system, wherein the confirmation data indicates that the audio input likely comprises data representing the wakeword;
     transmitting a subsequent audio input to the remote computing system based at least partly on receiving the confirmation data; and
     receiving subsequent speech recognition results from the remote computing system.

8. The computer-implemented method of claim 7, further comprising determining the energy level of the audio input using at least one of: a volume of the audio input, an intensity of the audio input, or an amplitude of the audio input.

9. The computer-implemented method of claim 7, wherein determining that the audio input likely comprises data representing a wakeword comprises performing speech recognition using the audio input and a wakeword model.

10. The computer-implemented method of claim 7, further comprising activating a digital signal processor in response to determining that the energy level satisfies the threshold, wherein the determining that the audio input likely comprises data representing the utterance is performed using the digital signal processor.

11. The computer-implemented method of claim 7, further comprising activating a microprocessor in response to determining that the audio input likely comprises data representing the utterance, wherein the determining that the audio input likely comprises data representing the wakeword is performed using the microprocessor.

12. The computer-implemented method of claim 7, further comprising presenting audio output using the speech recognition results, wherein the speech recognition results comprise audio data representing a response to the utterance.

13. The computer-implemented method of claim 7, further comprising determining a response to the utterance using the speech recognition results, wherein the speech recognition results comprise a transcription of the utterance.

14. The computer-implemented method of claim 7, wherein the receiving the audio input comprises:
  receiving a first portion of the audio input and storing the first portion of the audio input in a buffer; and
  receiving a second portion of the audio input and storing the second portion of the audio input in the buffer.

15. The computer-implemented method of claim 14, further comprising accessing the first portion of the audio input from the buffer,
  wherein the determining that the audio input likely comprises data representing the wakeword comprises determining that the first portion of the audio input likely comprises data representing the wakeword; and
  wherein the transmitting the audio input comprises transmitting the first portion of the audio input and the second portion of the audio input.

16. A system comprising:
  an input component configured to receive audio input; and
  one or more processors configured to at least:
    determine a value representing at least one of an energy level of the audio input or a first likelihood that the audio input comprises data representing an utterance;
    determine, based at least partly on the value, a second likelihood that the utterance comprises data representing a wakeword;
    determine, based at least partly on the second likelihood, to cause transmission of the audio input to a computing system;
    cause transmission of the audio input to the computing system;
    receive speech recognition results generated by the computing system;
    receive confirmation data from the computing system, wherein the confirmation data indicates that the audio input likely comprises data representing the wakeword;
    transmit a subsequent audio input to the computing system based at least partly on receiving the confirmation data;
    receive subsequent speech recognition results generated by the computing system.

17. The system of claim 16, wherein the one or more processors are configured to determine the first likelihood using a speech model and a value representing at least one of: a spectral slope between two frames of the audio input, an energy level of the audio input within a spectral band, or a signal-to-noise ratio of the audio input within a spectral band.

18. The system of claim 16, wherein the one or more processors are configured to determine the second likelihood using the audio input and a wakeword model.

19. The system of claim 16, wherein the speech recognition results comprise at least one of: a transcription of at least a portion of the utterance, a response to the utterance, or an executable command.

20. The system of claim 16, wherein the one or more processors comprises a digital signal processor and a microprocessor, wherein the digital signal processor is configured to determine the value, and wherein the microprocessor is configured to determine the second likelihood.

* * * * *